US008257670B1

(12) United States Patent
Dakshinamurthy et al.

(10) Patent No.: US 8,257,670 B1
(45) Date of Patent: Sep. 4, 2012

(54) MONODISPERSE GOLD NANOPARTICLES AND FACILE, ENVIRONMENTALLY FAVORABLE PROCESS FOR THEIR MANUFACTURE

(75) Inventors: Rajalingam Dakshinamurthy, Bowling Green, KY (US); Shivendra Sahi, Bowling Green, KY (US)

(73) Assignee: Western Kentucky University Research Foundation, Bowling Green, KY (US)

( * ) Notice: Subject to any disclaimer, the term of this patent is extended or adjusted under 35 U.S.C. 154(b) by 0 days.

(21) Appl. No.: 12/882,291

(22) Filed: Sep. 15, 2010

(51) Int. Cl.
*C01G 7/00* (2006.01)
*B22F 9/24* (2006.01)

(52) U.S. Cl. .......... 423/23; 502/172; 502/344; 977/775; 977/777; 75/343; 75/370

(58) Field of Classification Search .................. 977/775, 977/777; 502/344; 423/23; 75/343, 370; B22F 9/24; C01G 7/00
See application file for complete search history.

(56) References Cited

U.S. PATENT DOCUMENTS

| | | |
|---|---|---|
| 2005/0287552 A1 | 12/2005 | Lin et al. |
| 2007/0042485 A1 | 2/2007 | Heddle et al. |
| 2007/0051202 A1* | 3/2007 | Raghuraman et al. .......... 75/370 |
| 2008/0031960 A1 | 2/2008 | Wilson et al. |
| 2008/0050448 A1 | 2/2008 | Wilson et al. |
| 2008/0213783 A1 | 9/2008 | Hainfeld et al. |
| 2009/0239280 A1 | 9/2009 | De Windt et al. |
| 2010/0055199 A1 | 3/2010 | Mansoori |
| 2010/0251856 A1* | 10/2010 | Santhanam et al. ............. 75/370 |

OTHER PUBLICATIONS

Wang, Lijiang, Wei, Qingshan, Wu, Chunsheng, Hu, Zhaoying, Ji Jian, and Wang, Ping; The *Escherichia coil* 0157: H7 DNA detection on a gold nanoparticle-enhanced piezoelectric biosensor; Chinese Science Bulletin; vol. 53, No. 8; Apr. 2008, pp. 1175-1184; Science China Press, co-published with Springer.
Du, Liangwei, Jiang, Hong, Liu, Xiaohua and Wang, Erkang; Biosynthesis of gold nanoparticles assisted by *Escherichia coli* DH5 and its application on direct electrochemistry of hemoglobin; Electrochemistry Communications; vol. 9, Issue 5, May 2007, pp. 1165-1170.
He, Shiying, Guo, Zhirui, Zhang, Yu, Zhang, Song, Wang, Jing and Gu, Ning; Biosynthesis of gold nanoparticles using the bacteria *Rhodopseudomonas capsulata*; Materials Letters; vol. 61, Issue 18, Jul. 2007, pp. 3984-3987.
Varisli, Birsen Y., Neely, Adria, Candice, Perry, Arbneshi, Tahir, Senapati, Dulai, Singh, Anant K., Kalluri, Jhansi, Newton, Brandon and Ray Paresh C.; Gold Nanorod Based Selective Identification of *Escherichia coli* Bacteria Using Hyper Rayleigh Scattering Assay; Sixth International Symposium on Recent Advances in Environment Health Research, Department of Chemistry, Jackson State University, Jackson, MS, May 2010.

* cited by examiner

*Primary Examiner* — Melvin C Mayes
*Assistant Examiner* — Jun Li
(74) *Attorney, Agent, or Firm* — Middleton Reutlinger; G. David McClure, Jr.; John F. Salazar

(57) ABSTRACT

Disclosed are monodisperse gold nanoparticles (GNPs) manufactured by a facile, environmentally favorable process. Such a "green" synthesis process according to an embodiment of the invention effects the production of highly monodisperse, stable, catalytically active, and water-soluble GNPs in a considerable size range and advantageous yields. The production is accomplished inter alia through a single-step/single-phase method using dextrose as a reducing agent and as a capping agent in a buffered aqueous solution at moderate temperature. Disclosed also is a process for the direct embedment/integration of GNPs into biological systems such as the *Escherichia coli* bacterium without additional capping ligand or surface modification processes.

7 Claims, 6 Drawing Sheets

MONODISPERSE GOLD NANOPARTICLES AND FACILE, ENVIRONMENTALLY FAVORABLE PROCESS FOR THEIR MANUFACTURE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

Gold nanoparticles (GNPs) are useful as catalysts and for a wide variety of environmental, biomedical, and industrial chemical applications. To obtain GNPs, various wet chemical methods employing various polar and non-polar solvents have been used. The most common method is the reduction of tetralchloroauric acid ($HAuCl_4$) by excess sodium borohydride ($NaBH_4$) or sodium citrate in the presence of stabilizing/capping ligands such as citrate, thiolates, amines, phosphanes, carbonyls, dendrimers and surfactants. These methods have produced GNPs with sizes of 2-10 and 12-100 nm, respectively. A limitation of such methodology is that the GNPs produced by citrate methods beyond ~50 nm are non-spherical and polydisperse. Hydroquinone has also recently been employed as a reducing agent to make relatively monodisperse GNPs with particle size up to 175 nm from GNP seeds synthesized by a traditional citrate method. However, the use of hydroquinone, a suspected carcinogen, in conjunction with traditional citrates methods leaves the product GNPs with trace amounts of organic solvents. This raises environmental concerns and also limits the biocompatibility and biomedical application of GNPs, for which avoidance of cellular toxicity is essential.

There is accordingly a need for a reliable, clean, and eco-friendly "green" chemical process for the synthesis of GNPs. Utilization of non-toxic chemicals and solvents for the synthesis and assembly of nanoparticles is a most important aspect of such a "green" nanoparticle synthesis process. Additionally, it is to be desired that such a process obviate any need for highly laborious size-sorting or seeding of any preformed crystals. It should be noted in this regard that nanotechnology requires the synthesis of nanomaterials of different sizes, shapes and controlled disparity for various life science related applications. In particular, the synthesis and subsequent linkage of GNPs with various biological and chemical materials find a wide array of applications in gene transfer, bioprobes for cell and tissue analysis, catalysis, information storage, imaging and drug delivery. In this context, exploiting GNPs in the size scale of >50 nm is crucial for many biomedical applications including biomimetics of biological molecules (protein, DNA) and structures (viruses, bacteria).

BRIEF SUMMARY OF THE INVENTION

An embodiment of the invention provides monodisperse GNPs manufactured by a facile, environmentally favorable process. Such a "green" synthesis process according to an embodiment of the invention effects the production of highly monodisperse, stable, catalytically active, and water-soluble GNPs in a considerable size range and advantageous yields. The production is accomplished inter alia through a single-step/single-phase method using dextrose as a reducing agent and as a capping agent in a buffered aqueous solution at moderate temperature. An embodiment of the invention also provides a process for the direct embedment/integration of GNPs into biological systems such as the *Escherichia coli* bacterium without additional capping ligand or surface modification processes.

BRIEF DESCRIPTION OF THE DRAWINGS

Reference to the figures discloses several aspects and/or embodiments of the invention and is not to be interpreted as limiting the scope of the invention.

FIG. 1a shows absorbance (ordinate) plotted against wavelength in nm (abscissa) for GNPs according to an embodiment of the invention synthesized with 1 mg/mL, 4 mg/mL, 20 mg/mL, 100 mg/mL, or 200 mg/mL dextrose. FIG. 1b is a transmission electron micrograph (TEM) of GNPs of approximately 25 nm diameter according to an embodiment of the invention. FIG. 1c is a TEM of GNPs of approximately 35 nm diameter according to an embodiment of the invention. FIG. 1d is a TEM of GNPs of approximately 40 nm diameter according to an embodiment of the invention. FIG. 1e is a TEM of GNPs of approximately 50 nm diameter according to an embodiment of the invention. FIG. 1f is a TEM of GNPs of approximately 120 nm diameter according to an embodiment of the invention. FIG. 1g is a TEM of a GNP cluster. FIG. 1h shows particle size in nm (ordinate) plotted against concentration of dextrose in mg/mL (abscissa) for various GNPs according to an embodiment of the invention.

FIG. 2 also shows various aspects and/or embodiments of GNPs according to an embodiment of the invention. FIG. 2 (inset) shows the percentage of $KAuCl_4$ remaining in the reaction mixture (ordinate; value derived from absorption intensity of $Au^{3+}$ at 290 nm) plotted against concentration of dextrose in mg/mL (abscissa) for various embodiments of a reaction mixture according to an embodiment of the invention after three hours of reaction.

FIG. 3a shows absorbance (ordinate) plotted against wavelength in nm (abscissa) for GNPs according to an embodiment of the invention synthesized with various concentrations of $KAuCl_4$. FIG. 3b is a TEM of GNPs of approximately 10 nm diameter according to an embodiment of the invention. FIG. 3c is a TEM of GNPs of approximately 25 nm diameter according to an embodiment of the invention. FIG. 3d is a TEM of GNPs of approximately 35 nm diameter according to an embodiment of the invention. FIG. 3e is a TEM of GNPs of approximately 60 nm diameter according to an embodiment of the invention. FIG. 3f is a TEM of GNPs of approximately 120 nm diameter according to an embodiment of the invention. FIG. 3g is a TEM of a GNP cluster. FIG. 3h shows particle size in nm (ordinate) plotted against concentration of KAuCl$_4$ in mM (abscissa) for various GNPs according to an embodiment of the invention.

FIG. 4a is a TEM of GNPs of approximately 10 nm diameter according to an embodiment of the invention. FIG. 4b is a TEM of GNPs of approximately 60 nm diameter according to an embodiment of the invention. FIG. 4c is a TEM of GNPs of approximately 120 nm diameter according to an embodiment of the invention. FIG. 4d is a particle size distribution histogram in which is plotted number of GNPs (ordinate) against particle size in nm (abscissa) for GNPs shown in FIG. 4a. FIG. 4e is a particle size distribution histogram in which is plotted number of GNPs (ordinate) against particle size in nm (abscissa) for GNPs shown in FIG. 4b. FIG. 4f is a particle size distribution histogram in which is plotted number of GNPs (ordinate) against particle size in nm (abscissa) for GNPs shown in FIG. 4c.

FIG. 5a shows a TEM and a corresponding energy-dispersive X-ray spectrum of a sample of GNPs according to an embodiment of the invention. FIG. 5b-I shows a Fourier transform infrared (FTIR) spectrum of neat dextrose. FIG. 5b-II shows an FTIR spectrum of a sample of GNPs according to an embodiment of the invention.

FIG. 6a shows a series of TEMs of E. coli bacteria embedded with GNPs according to an embodiment of the invention. FIG. 6b shows absorbance (ordinate) plotted against wavelength in nm (abscissa) for reaction mixtures of p-nitrophenol, NaBH$_4$, and GNPs of various sizes according to an embodiment of the invention in which GNPs when present catalyze the reduction of p-nitrophenol. FIG. 6b (inset) shows the absorbance at 400 nm (ordinate) plotted against time in seconds (abscissa) for various embodiments of GNPs according to an embodiment of the invention in such a reaction mixture after three hours of reaction.

DETAILED DESCRIPTION OF THE INVENTION

The following detailed description of the invention is provided primarily for clearness of understanding of the invention. No unnecessary limitations are to be understood therefrom. To those skilled in the art, modifications will become obvious upon reading the disclosure and may be made without departing from the spirit of the invention and scope of the appended claims.

Embodiments of the invention are provided, inter alia, in various aspects, as enumerated below, yet solely for illustrative purposes, with equivalents clearly occurring to the person skilled in the art.

Aspect 1. A catalytically active composition comprising: metallic gold nanoparticles, wherein at least about 80% of the nanoparticles have particle size within about 1.5 nm of the median particle size of the nanoparticles; a reducing sugar; buffer salts; and water and/or another solvent that is a liquid at ambient temperature.

Aspect 2. The composition of Aspect 1, wherein the reducing sugar comprises dextrose.

Aspect 3. The composition of Aspect 1, wherein the buffer salts comprise a phosphate salt, a hydrogen phosphate salt, and/or a dihydrogen phosphate salt.

Aspect 4. The composition of Aspect 1, wherein the median particle size of the nanoparticles is between about 10 nm and about 120 nm.

Aspect 5. The composition of Aspect 1, wherein the pH of the composition is between about 6.6 and about 7.2.

Aspect 6. The composition of Aspect 1, wherein the reducing sugar comprises dextrose; the buffer salts comprise a phosphate salt, a hydrogen phosphate salt, and/or a dihydrogen phosphate salt; the median particle size of the nanoparticles is between about 10 nm and about 120 nm; and the pH of the composition is between about 6.6 and about 7.2.

Aspect 7. A process for making monodisperse metallic gold nanoparticles, the process comprising mixing at ambient temperature a composition comprising trivalent gold ions, a buffer, and a reducing sugar for a period of time sufficient for reduction of at least a portion of the trivalent gold ions to metallic gold and aggregation of at least a portion of said metallic gold into monodisperse nanoparticles, thereby forming monodisperse metallic gold nanoparticles.

Aspect 8. The process of Aspect 7, wherein the mixing comprises agitation.

Aspect 9. The process of Aspect 7, wherein the ambient temperature is between about 25 degrees Celsius and about 37 degrees Celsius.

Aspect 10. The process of Aspect 7, wherein the buffer comprises phosphate, hydrogen phosphate, and/or dihydrogen phosphate.

Aspect 11. The process of Aspect 7, wherein the reducing sugar comprises dextrose.

Aspect 12. The process of Aspect 7, wherein the composition has pH of between about 6.6 and about 7.2.

Aspect 13. The process of Aspect 7, wherein at least about 80% of the nanoparticles have particle size within about 1.5 nm of the median particle size of the nanoparticles.

Aspect 14. The process of Aspect 13, wherein the median particle size of the nanoparticles is between about 10 nm and about 120 nm.

Aspect 15. The process of Aspect 10, wherein the buffer comprises M9 minimal medium.

Aspect 16. Monodisperse metallic gold nanoparticles, produced at ambient temperature by the reduction of a trivalent gold composition by an excess of a reducing sugar in a buffered aqueous mixture.

Aspect 17. The nanoparticles of Aspect 16, wherein at least about 80% of the nanoparticles have diameter not less than about 1.5 nm less than the median diameter of the nanoparticles and not greater than about 1.5 nm greater than the median diameter of the nanoparticles.

Aspect 18. The nanoparticles of Aspect 16, wherein the ambient temperature is between about 25 degrees Celsius and about 37 degrees Celsius.

Aspect 19. The nanoparticles of Aspect 16, wherein the reducing sugar comprises dextrose.

Aspect 20. The nanoparticles of Aspect 16, wherein the buffered aqueous mixture has pH between about 6.6 and about 7.2

Aspect 21. The nanoparticles of Aspect 16, wherein the buffered aqueous mixture comprises M9 minimal medium.

Aspect 22. The nanoparticles of Aspect 16, wherein the nanoparticles are capable of catalyzing the reduction of p-nitrophenol in the presence of sodium borohydride in aqueous solution.

Aspect 23. The nanoparticles of Aspect 17, wherein the median diameter of the nanoparticles is between about 10 nm and about 120 nm.

Equivalents to the foregoing aspects will be readily apparent to the person skilled in the art.

For example, a reducing sugar according to an embodiment of the invention may preferably comprise dextrose, but another reducing sugar known to the person skilled in the art may be substituted therefor.

For example, a buffer salt according to an embodiment of the invention may preferably comprise the well-known phosphate/hydrogen phosphate/dihydrogen phosphate buffer system, yet other buffer systems may be substituted according to the knowledge of the person skilled in the art.

Similarly, ranges recited in various aspects are ranges that the person skilled in the art may rightly identify as capable of further extension, whether those ranges pertain to particle size or diameter; pH; ambient temperature; and so forth.

Likewise, the well-known minimal medium M9 is recited. Other minimal media supportive of microbial growth may be suitable, within the capacities of the person skilled in the art, for substitution for M9 minimal medium as a component of various reaction mixtures etc.

The following examples and technical details further illustrate, but do not limit or demarcate, the breadth of the invention. Accordingly:

An embodiment of the invention provides, inter alia, monodisperse GNPs with homogeneous approximately spherical shapes and sizes (diameters) ranging from about 10 nm or less to about 120 nm or more that are produced by the reduction of $Au^{3+}$ ions into $Au^0$ by a reducing sugar such as dextrose in a buffered aqueous solution such as M9 minimal medium prepared with appropriate ingredients, as, for example, in the following recipe: 2.6 g $KH_2PO_4$; 2.0 g $K_2HPO_4$; 1.8 g $Na_2HPO_4$; 0.48 g $K_2SO_4$; dextrose as appropriate; $KAuCl_4$ as appropriate; water q.v. to make 100 mL solution. M9 medium is a minimal growth medium known in the microbiological arts and used to grow various types of organisms including bacteria. It possesses many advantages, including that it is eco-friendly and cost-effective, has very low autofluorescence and also favorable absorbance properties.

An embodiment of the invention provides, inter alia, a process as follows for the manufacture of monodisperse GNPs: Different concentrations of $KAuCl_4$ were dissolved in a required volume of M9 minimal medium without any supplements in the presence of different concentrations of dextrose, thus forming a reaction medium, in a vessel. Then the vessel containing the reaction medium was placed in an orbital shaker. Dextrose, the reducing/capping agent, was included in excess with respect to $Au^{3+}$ in order to ensure that all $Au^{3+}$ ions were converted into GNPs, and also for efficient capping, to produce stable GNPs. Reactions were typically carried out at room temperature, although the reaction could be carried out at a temperature of 37° C. or even greater. The synthesis procedure was found to be scalable to larger volumes.

Figure 1:
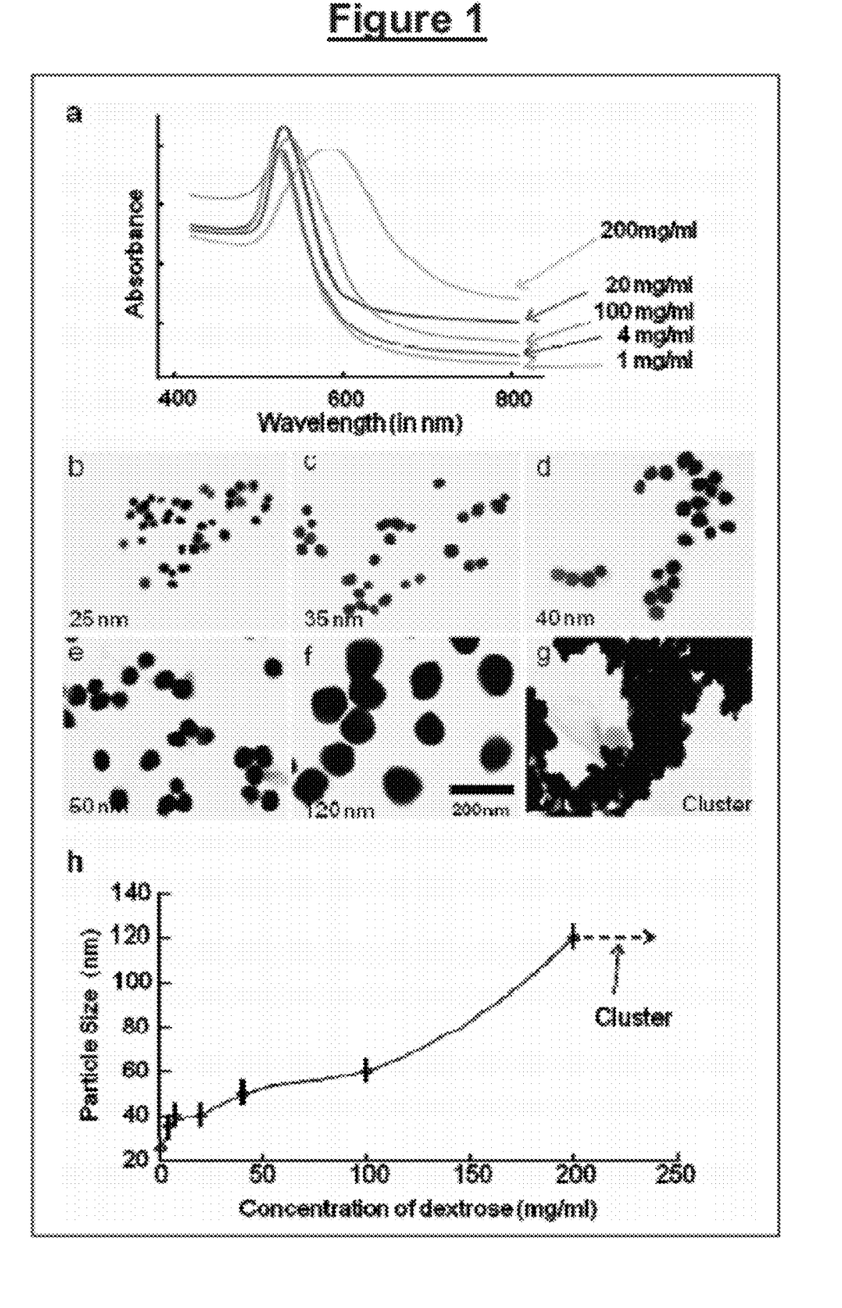
FIG. 1 shows various aspects and/or embodiments of gold nanoparticles (GNPs) according to an embodiment of the invention.
Figure 4:
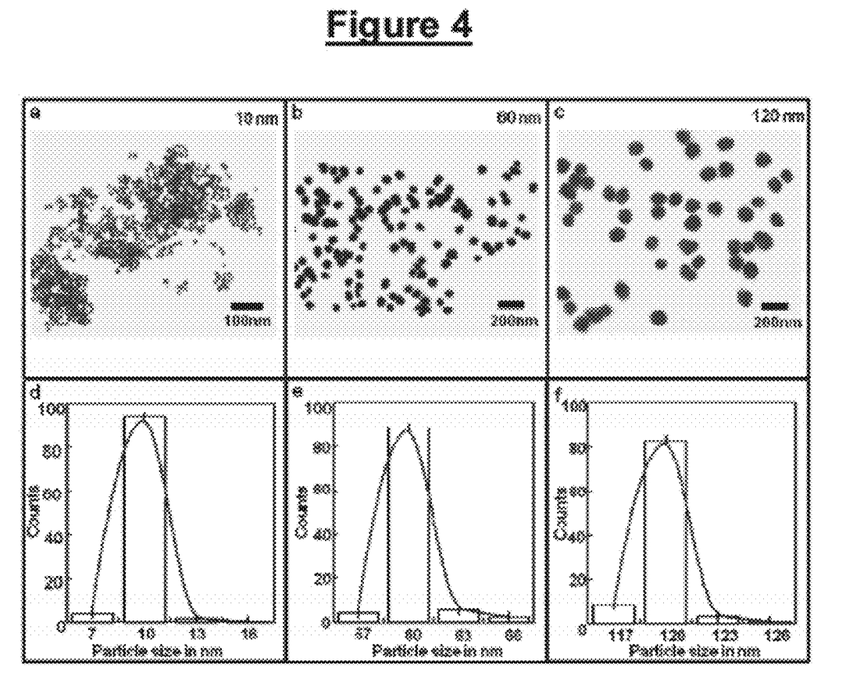
FIG. 4 also shows various aspects and/or embodiments of GNPs according to an embodiment of the invention.

Dextrose concentration dependent synthesis of GNPs: Ten samples with corresponding concentrations of 0.5, 0.75, 1, 4, 8, 20, 40, 100, 200 and 250 mg/ml of dextrose were prepared in M9 minimal media. After complete dissolution, a 0.5 mM solution of $KAuCl_4$ was added. Samples were incubated at room temperature for three hours in an orbital shaker. The color of the samples gradually changed within one hour. The UV/Vis absorption spectra of GNPs prepared with different concentrations of dextrose are shown in FIG. 1a. $\lambda_{max}$ values were observed in the range 520 nm to 580 nm. The shape and position of the surface plasmon resonance band are closely related to the shape, size, and dispersion of the GNPs. In particular, the longer absorption $\lambda_{max}$ values are typical for increasingly larger GNP diameter. GNPs were further examined using TEM. FIG. 1b through FIG. 1g illustrate representative TEM images of the GNPs. TEM observation indicates that the size of the GNPs could be altered in a controlled manner by changing the concentration of dextrose while keeping the gold concentration constant. In the dextrose concentration range of 0.5 to 250 mg/ml, the size of GNPs obtained was in range of 25 to 120 nm. It was evident that the average particle size of GNPs prepared with high concentration of dextrose (200 mg/ml) was much larger (120 nm). The GNPs were monodisperse and had a spherical shape with very narrow distribution (FIG. 4). With increasing concentration of dextrose (>200 mg/ml), signs of solid clusters or wire formation resulted (FIG. 1h). These clusters were very complex and it was sometimes difficult to distinguish one aggregate from another. From this it was inferred that particle growth is facile in the presence of dextrose concentration of up to 200 mg/ml. The results accordingly showed that increasing dextrose concentrations produced GNPs with increased size, likely due to efficient nucleation and capping.

Figure 2:
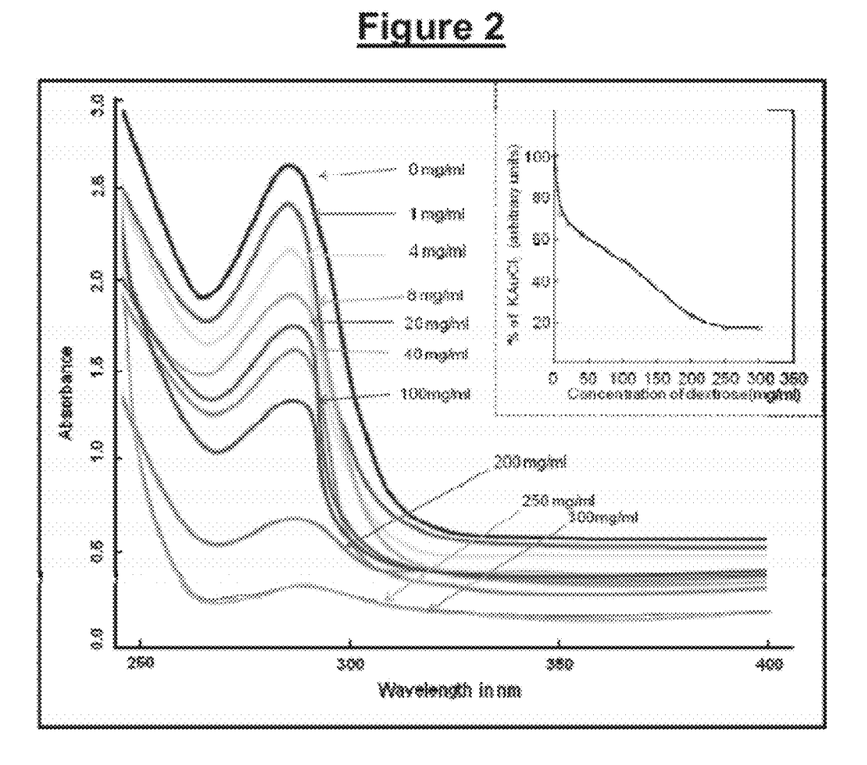
FIG. 2 shows absorbance (ordinate) plotted against wavelength in nm (abscissa) for a reaction mixture for the synthesis of GNPs according to an embodiment of the invention after three hours of reaction with 0 mg/mL, 1 mg/mL, 4 mg/mL, 8 mg/mL, 20 mg/mL, 40 mg/mL, 100 mg/mL, 200 mg/mL, 250 mg/mL, or 300 mg/mL dextrose.

Efficiency of dextrose as a reducing agent: Unused $Au^{3+}$ ions were quantified in reaction mixtures containing various concentrations of dextrose. GNPs were separated from samples by centrifugation followed by measurement of the concentration of supernatant $Au^{3+}$ ions using the UV/Vis-absorption peak at 290 nm (FIG. 2). The absorption peak at 290 nm disappeared with increasing concentrations of dextrose (0.5 to 250 mg/ml). For concentrations above 200 mg/ml of dextrose, the percentage of $Au^{3+}$ remained relatively constant (less than 20%), indicating the high efficiency and optimum concentration of dextrose. These results were consistent with a role of dextrose as a reducing agent, leading to controlled nucleation/capping, followed by controlled crystal growth, which depended on the concentration of both the gold as well as the reducing agent to produce dextrose-stabilized, homogeneous GNPs of different sizes.

Figure 3:
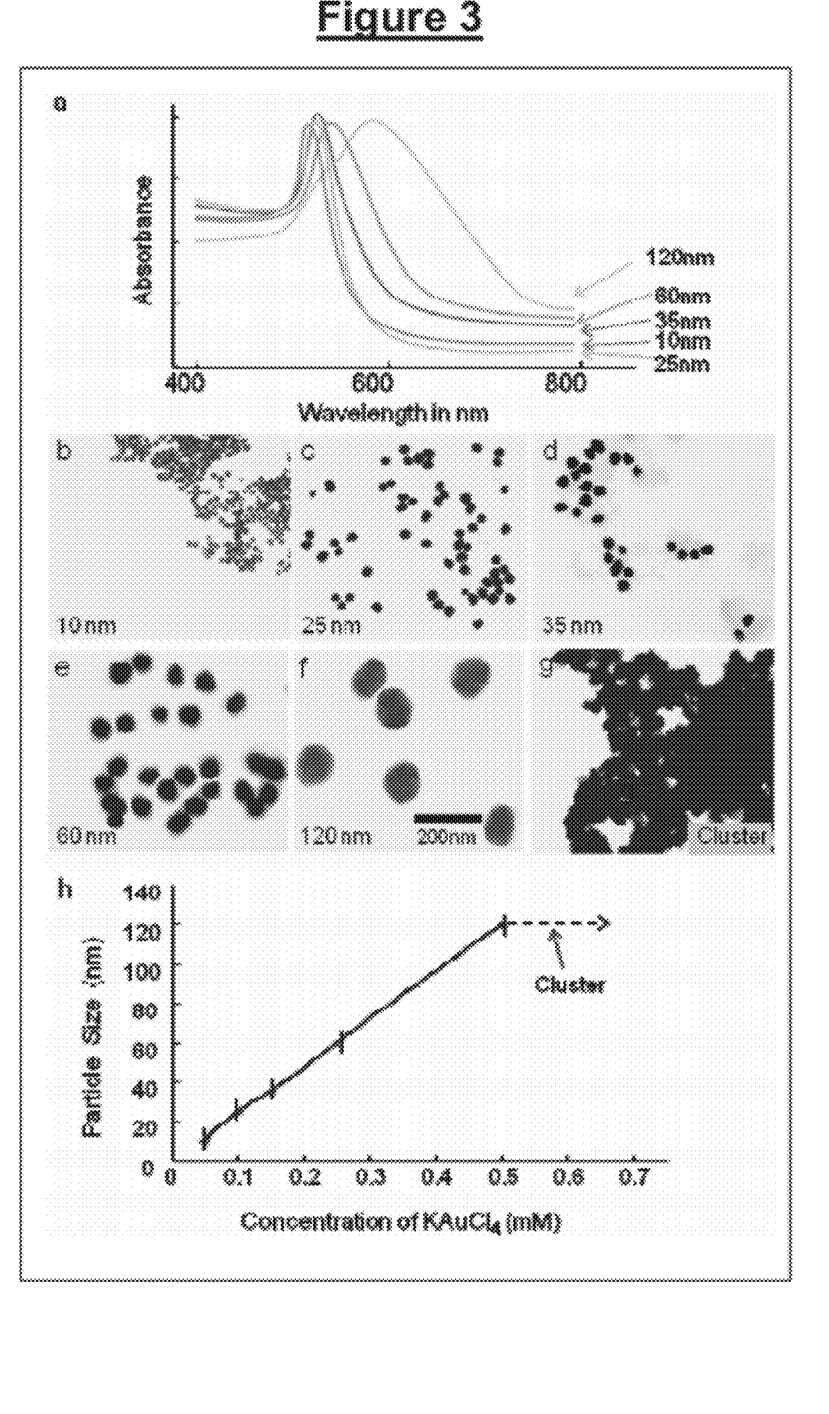
FIG. 3 also shows various aspects and/or embodiments of GNPs according to an embodiment of the invention.

Gold concentration dependent synthesis of GNPs: Samples with concentrations of 0.05, 0.1, 0.15, 0.25, 0.5, and 0.75 mM of $KAuCl_4$ solution were added to M9 minimal media containing 200 mg/ml of dextrose to form a mixture. The mixture was then incubated at room temperature for three hours. The color of the samples gradually changed within one hour. FIG. 3a shows the UV/Vis absorption spectra of GNPs prepared with different concentrations of $KAuCl_4$ solution. $\lambda_{max}$ values red shifted from 516 nm to 580 nm. Also, the plasmon resonance bands of the GNPs thus obtained were altered with the concentration of $KAuCl_4$ solution. TEM observation indicated that the size of the GNPs could be altered in a controlled manner by varying the concentration of $KAuCl_4$ solution while keeping the dextrose concentration constant. At the concentration range of 0.05 to 2.5 mM of $KAuCl_4$ solution, the size of GNPs obtained was with range of 10 to 120 nm (FIG. 3b through FIG. 3g). It was apparent that the average particle size of GNPs prepared with high concentration of $KAuCl_4$ (0.5 mM) was much larger (120 nm). The GNPs were monodisperse and had a spherical shape with very narrow distribution (FIG. 4). With increasingly higher concentration of $KAuCl_4$ solution (>0.5 mM), signs of complex clusters or wire formation resulted (FIG. 3h). From this it was inferred that particle growth is facile in the presence of $KAuCl_4$ solution concentration of up to 0.5 mM. These results showed that increasing $Au^{3+}$ concentrations produced GNPs with increased size, likely due to increased nucleation with controlled capping.

Figure 5:
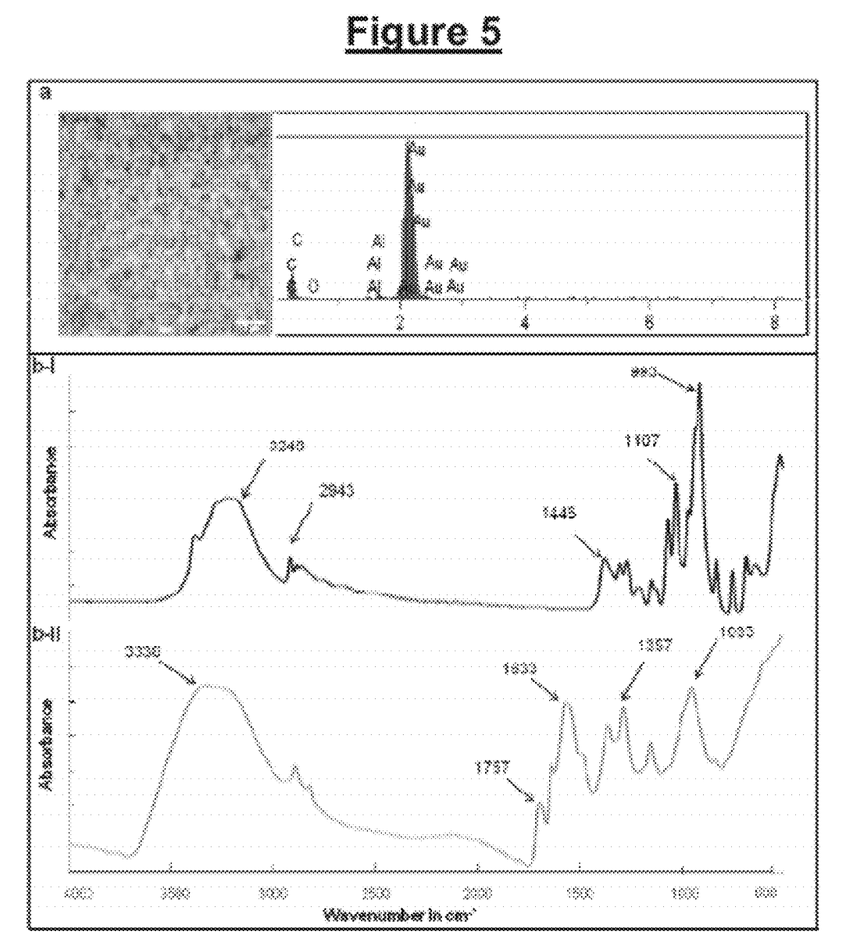
FIG. 5 also shows various aspects and/or embodiments of GNPs according to an embodiment of the invention.

Energy-dispersive spectroscopy (EDS) was used to identify the elemental composition of GNPs. Area-profile analysis of thoroughly washed GNP sample showed strong peaks of Au at 2.138 keV, characteristics of GNPs, along with carbon (elemental composition remained the same in the whole area of the sample as shown in FIG. 5a). The interaction between the dextrose and the GNPs was further analyzed by FTIR spectroscopy. FIG. 5b shows a comparison of the FTIR spectra of dextrose and GNPs synthesized using dextrose as a reducing agent. The strong absorption peak corresponding to hydroxyl group shifted from 3240 to 3338 nm$^{-1}$ due to the interaction between the surfaces of GNPs and the hydroxyl group of dextrose. These results demonstrate that the GNPs were associated with and stabilized by the capping ligand dextrose.

Figure 6:
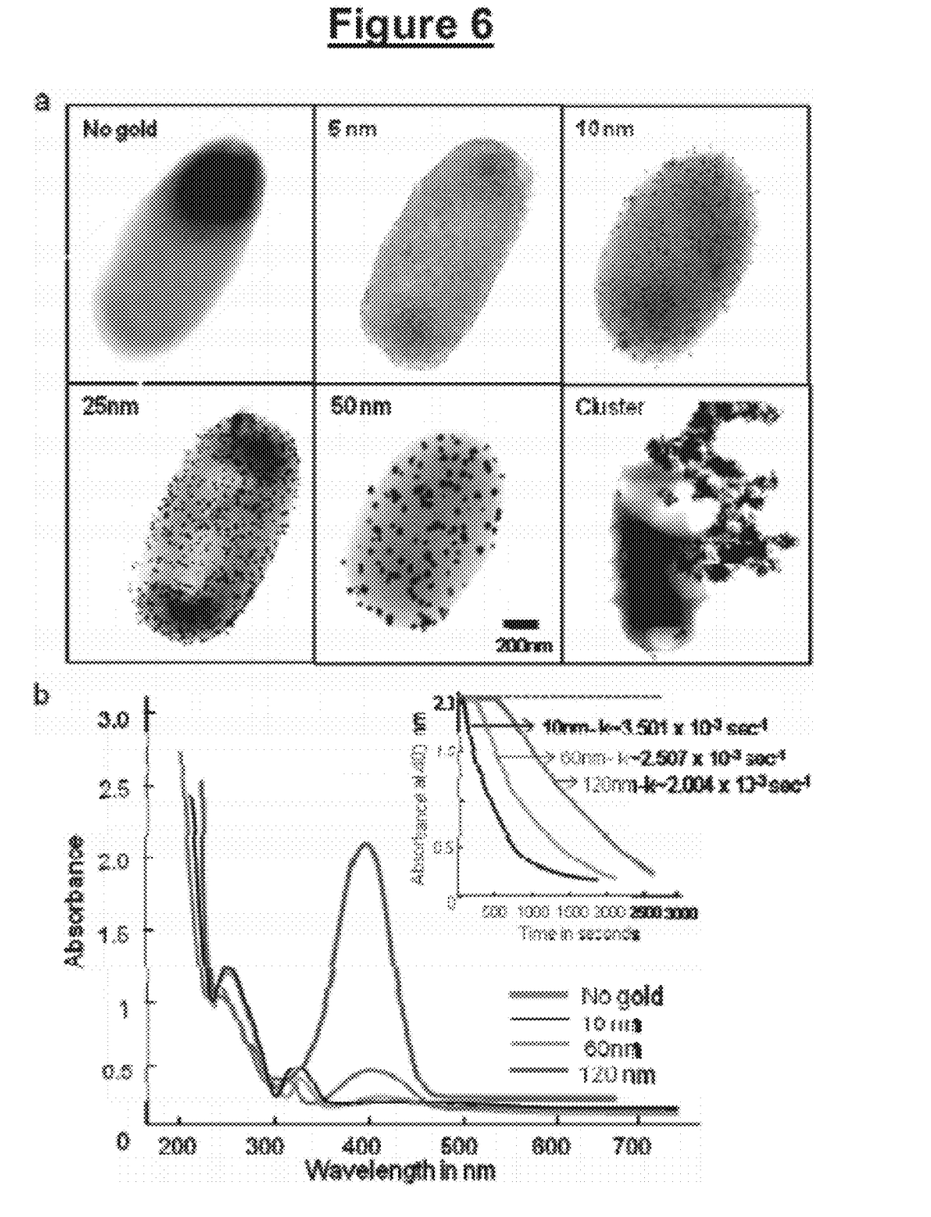
FIG. 6 also shows various aspects and/or embodiments of GNPs according to an embodiment of the invention.

Direct embedment/integration of GNPs into *Escherichia coli* bacterium: A process according to an embodiment of the invention enables uniform integration of GNPs into *Escherichia coli* bacterium without any secondary capping group, surfactants or surface modification. In order to embed the GNPs, M9 medium was prepared in presence of 4 mg/ml of dextrose with appropriate concentrations of nutrients (details in the experimental procedure). It was followed by the addition of bacterial cells and varying concentrations of KAuCl$_4$ (0.05-0.5 mM). The integration process of the reaction solution was monitored by visual inspection as well as measurements by UV/Vis absorption spectroscopy and TEM. The color of the samples gradually changed within a time period of an hour. A TEM micrograph shows several representative images of direct and uniform integration of GNPs of different sizes (from 5 nm to 50 nm) on the surface of the bacterium (FIG. 6a). A control experiment without addition of dextrose resulted in nonspecific aggregation and leaching of bacteria. The morphology of the GNPs integrated on the surface of the bacterium was homogeneous with definite spherical shape.

Catalytic function of GNPs: Catalytic activity of GNPs of different sizes was demonstrated in a model system, the reduction by NaBH$_4$ of p-nitrophenol, a toxic pollutant. An aqueous solution of p-nitrophenol shows an absorption peak at 317 nm. Upon addition of NaBH$_4$, the peak red shifts to 400 nm due to nitrophenolate ion formation. Addition of GNPs of different sizes (10, 60, and 120 nm) resulted in a reduction reaction. The intensity of the 400 nm peak dropped and resulted in fading of the color. Progress of the reaction was monitored by recording the absorbance at 400 nm (FIG. 6b). A control experiment with addition of 200 mg/ml of dextrose to the p-nitrophenol/NaBH$_4$ reaction mixture resulted in no change in absorbance in the absence of GNPs. In this context, pseudo-first-order kinetics was used to evaluate the rate constant of the catalytic reaction. Among the reactions catalyzed by different sizes of GNPs, GNPs with a size of 10 nm showed the fastest reaction rate (k~$3.501\times10^{-3}$ sec$^{-1}$) and the shortest time of absorption as compared to other sizes. These results clearly indicate that the catalytic activity of GNPs could be manipulated by controlling both the void spaces of the material and morphology through synthesis. The results also show that GNPs of different sizes are useful for the removal of toxic pollutant such as nitrophenols from the environment.

Experimental Procedures. The following experimental procedural details relate to various examples and/or embodiments and/or aspects of the invention described herein.

Materials: Chemicals including KAuCl$_4$/HAuCl$_4$ and dextrose were purchased from Aldrich. *E. coli* [BL21(DE3) pLysS] and pET20b(+) were purchased from Invitrogen. Analytical grade chemicals were typically used.

Synthesis of GNPs: GNPs were synthesized by the reduction of Au$^{3+}$ ions in an aqueous dextrose dispersion, prepared from a M9 minimal medium (~pH 6.9). In a typical preparation, an aqueous stock solution of KAuCl$_4$ or HAuCl$_4$ (appropriate concentrations after centrifugation to avoid any pre-formed Au$^0$ clusters) was added to the aqueous M9 medium containing different concentrations of dextrose. The samples were kept in an orbital shaker with a stirring speed of 150 rpm at room temperature for about 1-6 hours. The progress of GNP formation was monitored by the color change of the medium or by UV/Vis absorption spectrophotometry. Size-controlled GNPs were synthesized as described above by varying the concentration of KAuCl$_4$ (0.05-0.75 mM) and the concentration of dextrose (0.25 mg/ml-250 mg/ml) at a constant pH of about ~pH 6.9±0.2 (without addition of any acid or base). The aqueous GNP dispersion was centrifuged for 10 minutes at a speed of 12000 rpm, which deposited all the GNPs at the bottom of the tube. The precipitated GNPs were washed and resuspended several times with sterile water and then used for further analysis.

Characterization of GNPs: Transmission electron microscope (TEM) images were obtained to characterize the morphology and size distribution of GNPs. A 4 ul sample of a 1:4 (GNP stock:water) dilution of the particle solution was added onto carbon-coated copper grids and imaged on a JEOL-TEM. Elemental compositions, including carbon of the GNPs, were detected by energy dispersive X-ray spectroscopy (EDS) using a JEOL JSM-5400 LV with IXRF system. For the EDS analysis, each sample was washed several times with sterile water to obtain GNPs. Then the sample was allowed to dry in the desiccators onto the aluminum stub without any adhesive or other carbon coating material and analyzed. Particle diameter was determined by EDS 2000, version 2.6 software. Briefly, images were observed under TEM and obtained with the same area (7×11 cm$^2$). The scale marker (size of the grid×magnification=size on negative film) of 200 nm (obtained from the ruler, scanned under same number of pixels as that of negative film scan) was placed on the particle picture file. Briefly, images were imported into EDS 2000, Version 2.6 software and then the particle analysis option was chosen to get the particle diameter distribution on the basis of size (under the assumption that all the particles are spherical in shape). The output file was imported into KaleidaGraph and plotted to determine the exact size distribution. The absorption spectra of the synthesized GNPs were measured using a Perkin Elmer LAMBDA 35 UV/Vis spectrophotometer. The infrared spectra (FTIR) for the dried samples were recorded on a Perkin Elmer Spectrum 100 FT-IR spectrometer with a single-reflection diamond ATR accessory.

Estimation of free Au$^{3+}$ ion concentration: To estimate the unused Au$^{3+}$ ion concentration (to determine the efficiency of the increase in the concentration of dextrose), the reaction was allowed to go to completion. Then the GNPs were separated from the unreacted Au$^{3+}$ ions by centrifuging the reaction mixture 10 minutes at a speed of 12000 rpm, and the supernatant was collected. The concentration of Au$^{3+}$ ions in the supernatant was measured by the absorbance at 290 nm by using a UV/Vis spectrophotometer. Appropriate background corrections were made for each measurement with reaction-free medium.

Embedment/integration of GNPs into bacteria: To achieve the integration of GNPs in *E. coli*, the composition of the M9 medium was slightly modified. Since the *E. coli* strain BL21 (DE3)pLysS is vitamin B1-deficient, the medium was supplemented with thiamine (vitamin B1). Also appropriate antibiotics and other nutrients were included to supplement the medium, according to the recipe: 2.6 g KH$_2$PO$_4$; 2.0 g K$_2$HPO$_4$; 1.8 g Na$_2$HPO$_4$; 0.48 g K$_2$SO$_4$; 0.1 g NH$_4$Cl; 0.203 g MgCl$_2$; 0.00147 g CaCl$_2$; 0.0025 g thiamine; 0.00034 g riboflavin; 0.00005 g ampicillin; 0.000036 g chloramphenicol; dextrose as appropriate; KAuCl$_4$ as appropriate; water q.v. to make 100 mL solution. Vector encoding cDNA's of human FGF-1, D2 domain of FGFR2, human IL-1a were transformed into BL21(DE3)pLysS cells. *E. coli* cells were grown in 500 ml of sterile M9 minimal medium containing 4 mg/ml dextrose, 100 µg/ml ampicillin and 34 µg/ml of chloramphenicol, overnight at 37° C. Cells were harvested by centrifugation at 6000 rpm for 10 minutes and washed several times with sterile water. Then equal density of harvested bacteria cells were resuspended in M9 minimal medium in the presence of 4 mg/ml of dextrose. Appropriate concentrations of aqueous solution of KAuCl4 were added to this suspension. The mixture was kept in an orbital shaker at room temperature (or in the temperature range from 25° C. to 37° C.) and the reaction was carried out for a period of three hours. The progress of formation of GNP integrated *E. coli* cells was monitored by visualizing the change of color of the medium from orange to purple. The aqueous GNP-*E. coli* dispersion was then centrifuged for 10 minutes at 12000 rpm, whereby GNP-integrated *E. coli* cells were deposited at the bottom of the tube. The precipitated GNP-*E. coli* dispersion was washed several times with sterile water for use in further analysis.

Scale-up process: The scale-up process of both the synthesis and the embedment of GNPs was achieved by increasing the volume of the minimal media in presence of appropriate concentrations of dextrose, $KAuCl_4$ and any appropriate other nutrients.

Catalytic activity of GNPs: The catalytic reduction of p-nitrophenol by GNPs was monitored by UV/Vis spectrophotometry using a 1 ml quartz cell with path length of 1 cm. The reaction was carried out by adding a $NaBH_4$ solution (250 ul of 20 mM) to a p-nitrophenol solution (200 ul of 0.5 mM), resulting in a color change from light yellow to green-yellow and a red shift from 315 nm to 400 nm. This was followed by an immediate addition of GNPs of appropriate size. The resulting time-dependent absorption spectra were recorded at room temperature.

Accordingly, an embodiment of the invention provides monodisperse gold nanoparticles and a facile, environmentally favorable process for their manufacture. The foregoing detailed description of the invention is provided primarily for clearness of understanding of the invention. No unnecessary limitations are to be understood therefrom. To those skilled in the art, modifications will become obvious upon reading the disclosure and may be made without departing from the spirit of the invention and scope of the appended claims. The figures show several aspects and/or embodiments of gold nanoparticles according to an embodiment of the invention, including inter alia aspects and/or embodiments of their monodispersity, their size, their catalytic activity, and their spectral properties. This is not to be considered an exhaustive list of aspects and/or embodiments of gold nanoparticles as are considered to be within the scope of the invention, nor are the examples and/or embodiments of the foregoing verbal description to be considered an exhaustive list of aspects and/or embodiments of gold nanoparticles as are considered to be within the scope of the invention.

What is claimed is:

1. A process for making metallic gold nanoparticles, the process comprising mixing at ambient temperature a composition comprising trivalent gold ions, a buffer comprising M9 minimal medium, and a reducing sugar for a period of time sufficient for reduction of at least a portion of the trivalent gold ions to metallic gold and aggregation of at least a portion of said metallic gold into nanoparticles, thereby forming metallic gold nanoparticles wherein at least about 80% of the nanoparticles have particle size within about 1.5 nm of the median particle size of the nanoparticles and wherein the median diameter of the nanoparticles is between about 10 nm and about 120 nm.

2. The process of claim 1, wherein the mixing comprises agitation.

3. The process of claim 1, wherein the ambient temperature is between about 25 degrees Celsius and about 37 degrees Celsius.

4. The process of claim 1, wherein the reducing sugar comprises dextrose.

5. The process of claim 1, wherein the composition has pH of between about 6.6 and about 7.2.

6. A process for making metallic gold nanoparticles wherein at least about 80% of the nanoparticles have particle size within about 1.5 nm of the median particle size of the nanoparticles and wherein the median diameter of the nanoparticles is between about 10 nm and about 120 nm, comprising:

initially mixing at ambient temperature a composition comprising trivalent gold ions, a buffer comprising M9 minimal medium, and a reducing sugar;

further mixing said composition at a temperature of between about 25 and about 37 degrees Celsius for a period of time sufficient for reduction of at least a portion of the trivalent gold ions to metallic gold and aggregation of at least a portion of said metallic gold into nanoparticles;

ceasing said further mixing once at least about 80% of said nanoparticles have attained a size within a range of bout 1.5 nm of a median particle size of between about 10 nm and about 120 nm;

thereby forming metallic gold nanoparticles wherein at least about 80% of the nanoparticles have particle size within about 1.5 nm of the median particle size of the nanoparticles and wherein the median diameter of the nanoparticles is between about 10 nm and about 120 nm from said composition.

7. The process of claim 6 further including maintaining the pH of said composition to between about 6.6 and about 7.2.

* * * * *